(12) United States Patent
Zhang et al.

(10) Patent No.: US 11,429,853 B2
(45) Date of Patent: Aug. 30, 2022

(54) SYSTEMS AND METHODS FOR DETERMINING AN ARTIFICIAL INTELLIGENCE MODEL IN A COMMUNICATION SYSTEM

(71) Applicant: Gyrfalcon Technology Inc., Milpitas, CA (US)

(72) Inventors: Yequn Zhang, San Jose, CA (US); Yongxiong Ren, San Jose, CA (US); Baohua Sun, Fremont, CA (US); Lin Yang, Milpitas, CA (US); Qi Dong, San Jose, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 840 days.

(21) Appl. No.: 16/189,903

(22) Filed: Nov. 13, 2018

(65) Prior Publication Data

US 2020/0151551 A1    May 14, 2020

(51) Int. Cl.
*G06N 3/04* (2006.01)
*G06K 9/62* (2022.01)
*G06N 3/063* (2006.01)
*G06N 5/02* (2006.01)

(52) U.S. Cl.
CPC ........... *G06N 3/0635* (2013.01); *G06K 9/627* (2013.01); *G06N 3/04* (2013.01); *G06N 3/0454* (2013.01); *G06N 5/022* (2013.01)

(58) Field of Classification Search
CPC ..................... G06N 3/0454; G06K 9/627
See application file for complete search history.

(56) References Cited

U.S. PATENT DOCUMENTS

| | | | | |
|---|---|---|---|---|
| 10,805,317 | B2* | 10/2020 | Musuvathi | G06N 7/005 |
| 11,120,364 | B1* | 9/2021 | Gokalp | G06N 5/04 |
| 11,138,517 | B2* | 10/2021 | Sanketi | G06N 20/00 |
| 2017/0116520 | A1* | 4/2017 | Min | G06N 3/08 |
| 2018/0331897 | A1* | 11/2018 | Zhang | G06N 20/00 |
| 2019/0349266 | A1* | 11/2019 | Johnsson | H04L 41/0893 |
| 2020/0027033 | A1* | 1/2020 | Garg | H04L 67/34 |
| 2020/0034747 | A1* | 1/2020 | Elturki | G06N 3/08 |

OTHER PUBLICATIONS

Konecny, "Federated Learning: Privacy-Preserving Collaborative Machine Learning Without Centralized Training Data," Trends in Optimization Seminar, University of Washington, Seattle, Jan. 2018, p. 1-164.

* cited by examiner

*Primary Examiner* — Hal Schnee
(74) *Attorney, Agent, or Firm* — Wolf, Greenfield & Sacks, P.C.

(57) ABSTRACT

A system may include multiple client devices and a processing device communicatively coupled to the client devices. Each client device includes an artificial intelligence (AI) chip and is configured to generate an AI model. The processing device may be configured to (i) receive a respective AI model and an associated performance value of the respective AI model from each of the plurality of client devices; (ii) determine an optimal AI model based on the performance values associated with the respective AI models from the plurality of client devices; and (iii) determine a global AI model based on the optimal AI model. The system may load the global AI model into an AI chip of a client device to cause the client device to perform an AI task based on the global AI model in the AI chip. The AI model may include a convolutional neural network.

16 Claims, 4 Drawing Sheets

SYSTEMS AND METHODS FOR DETERMINING AN ARTIFICIAL INTELLIGENCE MODEL IN A COMMUNICATION SYSTEM

FIELD

This patent document relates generally to systems and methods for providing artificial intelligence solutions. Examples of determining an artificial intelligence model for loading into an artificial intelligence chip in a communication system are provided.

BACKGROUND

Artificial intelligence solutions are emerging with the advancement of computing platforms and integrated circuit solutions. For example, an artificial intelligence (AI) integrated circuit (IC) may include a processor capable of performing AT tasks in embedded hardware, Hardware-based solutions, as well as software solutions, still encounter the challenges of obtaining an optimal AI model, such as a convolutional neural network (CNN). A CNN may include multiple convolutional layers, and a convolutional layer may include multiple weights. Given the increasing size of the CNN that can be embedded in an IC, a CNN may include hundreds of layers and may include tens of thousands of weights. For example, the size of the weights for an embedded CNN inside an AI chip may be as large as a few megabytes. This makes it difficult to obtain an optimal CNN model because a large amount of computing times are needed.

BRIEF DESCRIPTION OF THE DRAWINGS

The present solution will be described with reference to the following figures, in which like numerals represent like items throughout the figures.

DETAILED DESCRIPTION

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Unless defined otherwise, all technical and scientific terms used in this document have the same meanings as commonly understood by one of ordinary skill in the art.

Each of the terms "artificial intelligence logic circuit" and "AI logic circuit" refers to a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Each of the terms "integrated circuit," "semiconductor chip," "chip," and "semiconductor device" refers to an integrated circuit (IC) that contains electronic circuits on semiconductor materials, such as silicon, for performing certain functions. For example, an integrated circuit can be a microprocessor, a memory, a programmable array logic (PAL) device, an application-specific integrated circuit (ASIC), or others. An integrated circuit that contains an AI logic circuit is referred to as an AI integrated circuit.

The term "AI chip" refers to a hardware- or software-based device that is capable of performing functions of an NI logic circuit. An AI chip can be a physical IC. For example, a physical AI chip may include an embedded cellular neural network (CeNN), which may contain parameters of a CNN. The AI chip may also be a virtual chip, i.e., software-based. For example, a virtual AI chip may include one or more process simulators to simulate the operations of a physical AI IC.

The term of "AI model" refers to data that include one or more weights that are used for, when loaded inside an AI chip, executing the AI chip. For example, an AI model for a given CNN may include the weights and/or parameters for one or more convolutional layers of the CNN.

Figure 1:
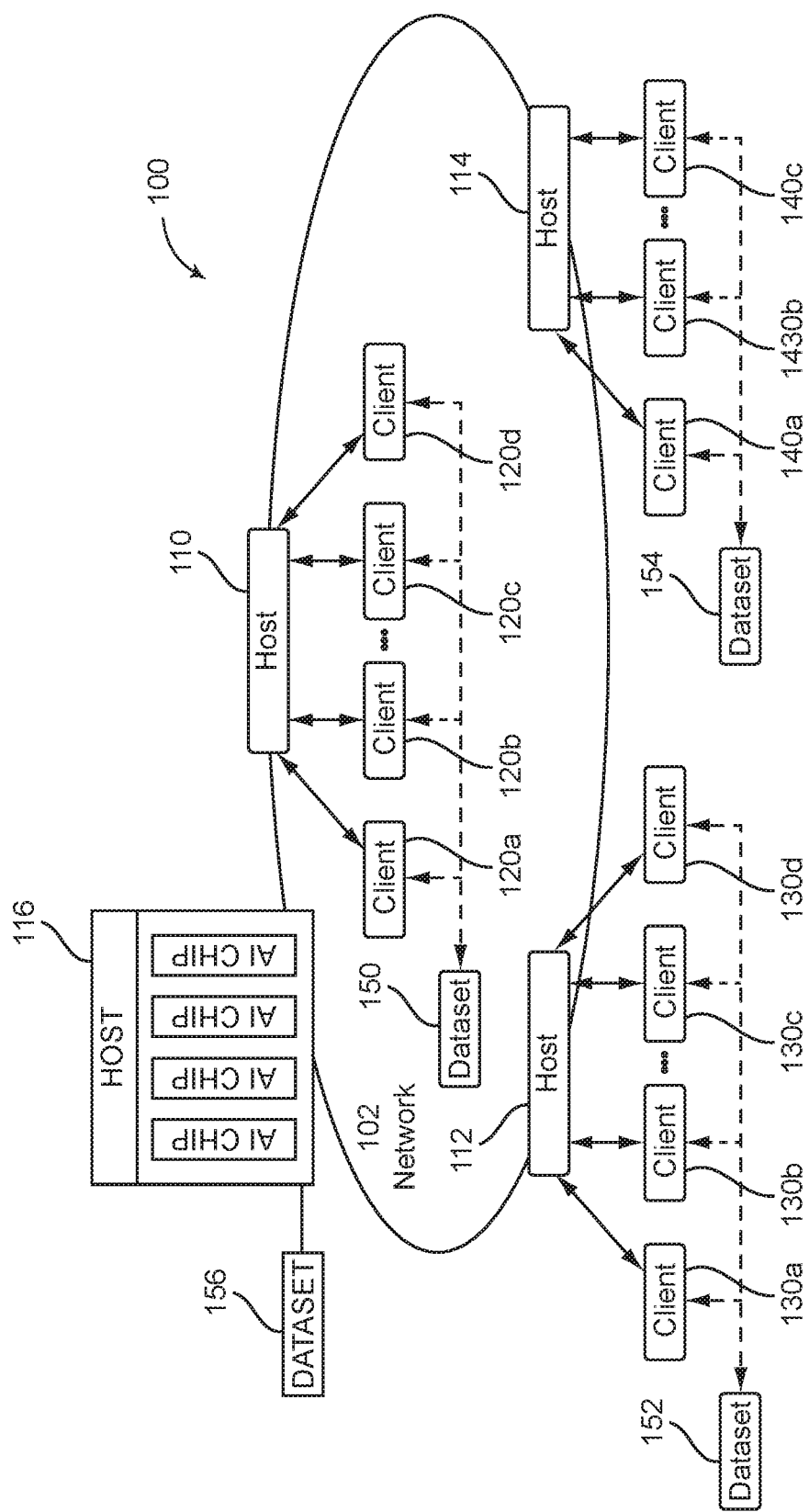
FIG. 1 illustrates an example system in accordance with various examples described herein.

FIG. 1 illustrates an example system in accordance with various examples described herein. In some examples, a communication system 100 includes a communication network 102. Communication network 102 may include any suitable communication links, such as wired (e.g., serial, parallel, optical, or Ethernet connections) or wireless (e.g., Wi-Fi, Bluetooth, or mesh network connections), or any suitable communication protocols now or later developed. In some scenarios, system 100 may include one or more host devices, e.g., 110, 112, 114, 116. A host device may communicate with another host device or other devices on the network 102. A host device may also communicate with one or more client devices via the communication network 102. For example, host device 110 may communicate with client devices 120a, 120b, 120c, 102d, etc. Host device 112 may communicate with 130a, 130b, 130c, 130d, etc. Host device 114 may communicate with 140a, 140b, 140c, etc. A host device, or any client device that communicates with the host device, may have access to one or more datasets used for obtaining an AI model. For example, host device 110 or a client device such as 120a, 120b, 120c, or 120d may have access to dataset 150.

In FIG. 1, a client device may include a processing device. A client device may also include one or more AI chips. In some examples, a client device may be an AI chip. The AI chip may be a physical AI IC. The AI chip may also be software-based, i.e., a virtual AI chip that includes one or more process simulators to simulate the operations of a physical AI IC. A processing device may include an AI IC and contain programming instructions that will cause the AI IC to be executed in the processing device. Alternatively, and/or additionally, a processing device may also include a virtual AI chip, and the processing device may contain programming instructions configured to control the virtual AI chip so that the virtual AI chip may perform certain AI functions. In FIG. 1, each client device, e.g., 120a, 120b, 120c, 120d may be in electrical communication with other client devices on the same host device, e.g., 110, or client devices on other host devices.

In some examples, the communication system 100 may be a centralized system. System 100 may also be a distributed or decentralized system, such as a peer-to-peer (P2P) system, example, a host device, e.g., 110, 112, 114, and 116, may be a node in a P2P system. In a non-limiting example, a client devices, e.g., 120a, 120b, 120c, and 120d may include a processor and an AI physical chip. In another non-limiting example, multiple AI chips may be installed in a host device. For example, host device 116 may have multiple AI chips installed on one or more PCI boards in the host device or in a USB cradle that may communicate with the host device. Host device 116 may have access to dataset 156 and may communicate with one or more AI chips via PCI board(s), internal data buses, or other communication protocols such as universal serial bus (USB).

In some scenarios, the AI chip may contain an AI model for performing certain AI tasks. In some examples, an AI model may include a forward propagation neural network, in which information may flow from the input layer to one or more hidden layers of the network to the output layer. For example, an AI model may be a convolutional neural network (CNN) that is trained to perform voice or image recognition tasks. A CNN may include multiple convolutional layers, each of which may include multiple weights and parameters. In such case, an AI model may include one or more parameters and/or weights of the CNN model. In some examples, the weights of a CNN model may include a mask and a scalar for a given layer of the CNN model. For example, a kernel in a CNN layer may be represented by a mask that has multiple values in lower precision multiplied by a scalar in higher precision. In some examples, an output channel of a CNN layer may include one or more bias values that, when added to the output of the output channel, adjust the output values to a desired range.

In the case of physical AI chip, the AI chip may include an embedded cellular neural network that has a memory for containing the multiple weights in the CNN. In some scenarios, the memory in a physical AI chip may be a one-time-programmable (OTP) memory that allows a user to load a CNN model into the physical AI chip once. Alternatively, a physical AI chip may have a random access memory (RAM) or other types of memory that allows a user to update and load a CNN model into the physical AI chip multiple times.

In the case of virtual AI chip, the AI chip may include a data structure to simulate the cellular neural network in a physical AI chip. A virtual AI chip can be of particular advantageous when multiple tests need to be run over various CNNs in order to determine a model that produces the best performance (e.g., highest recognition rate or lowest error rate). In a test run, the weights in the CNN can easily vary and be loaded into the virtual AI chip without the cost associated with a physical AI chip. Only after the CNN model is determined will the CNN model be loaded into a physical AI chip for real-time applications. Training a CNN model may require significant amount of computing power, even with a physical AI chip because a CNN model may include tens of thousands of weights. For example, a modern physical AI chip may be capable of storing a few megabytes of weights inside the chip.

With further reference to FIG. 1, a host device on a communication network as shown in FIG. 1 (e.g., 110) may include a processing device and contain programming instructions that, when executed, will cause the processing device to access a dataset, e.g., 150, for example, test data. The test data may be provided for use in obtaining the AI model. In doing so, the AI model may be specific to the test data. For example, test data may be used for training an AI model that is suitable for face recognition tasks, and may contain any suitable dataset collected for performing face recognition tasks. In another example, test data may be used for training an AI model suitable for scene recognition in video and images, and may contain any suitable scene dataset collected for performing scene recognition tasks. In some scenarios, test data may be residing in a memory in a host device. In one or more other scenarios, test data may be residing in a central data repository and is available for access by any of the host devices (e.g., 110, 112, 114 in FIG. 1) or any of the client devices (e.g., 120a-d, 140a-d in FIG. 1) via the communication network 102. In some examples, system 100 may include multiple test sets, such as datasets 150, 152, 154. A CNN model may be obtained by using the multiple devices in a communication system such as shown in FIG. 1. Details are further described with reference to FIGS. 2-3.

Figure 2:
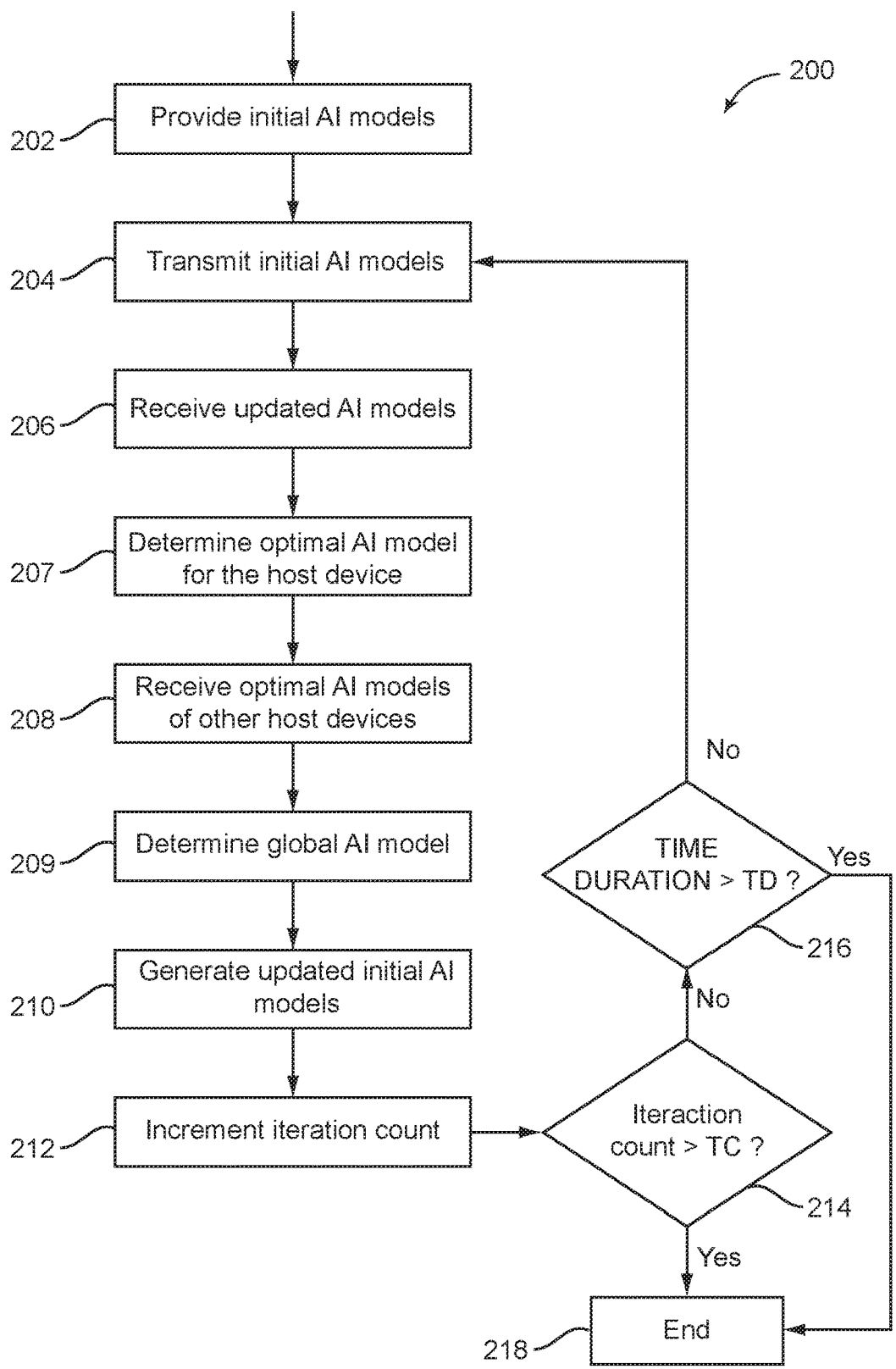
FIG. 2 illustrates a diagram of an example process for obtaining a global AI model in accordance with various examples described herein.

FIG. 2 illustrates a diagram of an example process for obtaining a global optimal AI model in accordance with various examples described herein. In some examples, a host device (such as 110 in FIG. 1) may be configured to program one or more client devices or one or more AI chips to which the host device is communicating (120a, 120b, 120c, 120d under host device 110, or one or more AI chips under host 116) to cause the multiple client devices or AI chips to determine an AI model for that host device. For example, a process 200, which may be implemented in a host device (e.g., 110, 112, 114 in FIG. 1), may include providing initial AI models at 202 for the client devices under the host device. Process 200 may also include transmitting the initial AI models at 204 to the client devices and/or AI chips. In some examples, the initial AI models may include multiple initial AI models, each for a respective client device or an AI chip (under the host device). The initial AI models may be identical for all or some client devices or AI chips. Initial AI models may also be different among different client devices or AI chips. Once a client device or an AI chip receives a respective initial AI model, that client device or AI chip may execute an AI task using the initial AI model to generate a respective updated AI model, which process may further be described.

With further reference to FIG. 2, process 200 may include receiving updated AI models at 206 from the one or more client devices (or AI chips). In some examples, a client device may return a client device updated AI model to the host device. The host device subsequently receives multiple AI models, each from a client device. Process 200 may subsequently determine the optimal AI model for the host device at 207 based on the updated AI models of one or more client devices and a performance value associated with each AI model. Process 200 may repeat for a number iterations until the iteration count has exceeded a threshold $T_c$ at 214 or the time duration of the process has exceeded a threshold $T_D$ at 216. At each iteration, process 200 continues receiving updated AI models from the client devices at 206 and determining the optimal AI model for the host device at 207. For example, $M''_{i,0}, M''_{i,1}, \ldots, M''_{i,N-1}$ represent the updated AI model from each client device 0, 1, 2, ... N−1, respectively, at ith iteration, where N represents the number of client devices under the host device. Let $A''_{i,0}, A''_{i,1}, \ldots, A''_{i,N-1}$ stand for the performance value of the updated AI model from each client device at ith iteration.

In some examples, a model M may include one or more parameters and/or weights of the CNN model, such as the scalar, the mask, and the bias values. Model M may have any suitable data structure. For example, model M may include a flat one-dimensional (1D) structure that holds the CNN parameters and weights sequentially from a few bytes to a few megabytes or more. The parameters may depend on the CNN model, the M task for which the AI model is to be obtained, and the dataset for performing the AI task using the AI chip. For example, an AI task having different levels of difficulties may require different sets of CNN parameters.

In some examples, a performance value A may include a single value measured as the recognition accuracy associated with an AI model M, such as the updated AI model from a client device. For example, $A''_{i,0}$ may stand for the performance of model $M''_{i,0}$ and have a value of 0.5. If $H_{i,j}$ stands for the optimal AI model for the host device j at ith iteration, where j=0, 1, . . . , K−1, with K being the number of hosts in the network, then $H_{i,j}$ may be determined as $H_{i,j}=E(M''_{i,0}, M''_{i,1}, \ldots, M''_{i,N-1}, A''_{i,0}, A''_{i,1}, \ldots, A''_{i,N-1}$ In other words, at each iteration, the optimal AI model for a host may be determined based on the received updated AI models and associated performance values from one or more client devices under that host. In a non-limiting example, a host device may determine the optimal AI model for that host device by selecting a received updated AI model that has the best performance value among all client devices under that host. For example, if the performance value represents the accuracy of recognition using an AI model, then selecting the best performance includes selecting an AI model that has the highest performance value among all client devices under the host device.

Although it is illustrated that, at each iteration, the optimal AI model for a host may be determined based on the received AI models and associated performance values from one or more client devices under that host, other variations may be possible. For example, the optimal AT model may be determined based on criteria other than the best performance value. In some examples, the optimal AI model for a host device may be determined based on the performance value of a subset of the client devices under that host device. For example, the process may select among top five of a total of ten client devices, or remove the bottom two client devices, in terms of performance value of the AI model for each client device.

Returning to FIG. 2, process 200 may further determine a global AI model at 209 based on the received AI models from the client devices. At each repeat (iteration), process 200 continues to update the global AI model at 209 and increments the iteration count at 212. If the iteration count has exceeded the threshold $T_c$ at 214 or the time duration has exceeded the threshold $T_D$ at 216, the process ends at 218. In some scenarios, when the process ends, the global optimal AI model is obtained as the final global AI model in process 200. In some examples, the process may output the final global AI model, as the global optimal AI model, to the one or more hosts on the network. Upon receiving the final global AI model, a host device may load the global optimal AI model into one or more client devices under that host device such as the AI chip in the client devices for performing future AI recognition tasks. In some examples, the global optimal AI model may be shared among multiple processing devices on the network, in which any device may load the global optimal AI model into an embedded CeNN and execute CeNN to perform recognition tasks based on the global optimal AI model. If none of the thresholds have been reached, process 200 repeats transmitting the updated initial AI models to the client devices at 204. The global AI model after the iteration has ended will be the final global AI model. At this time, process 200 has obtained the final AI model for the system.

In determining the global AI: model at 209 at each iteration, the process may select the optimal AI model that has the best performance value among all host devices. For example, a host device may determine the optimal AI model for that host device at 207 and make that optimal AI model sharable among other host devices on the network. In a non-limiting example, process 200 may include accessing all other host devices and receiving information about their optimal AI models at 208. Let $H_{i,0}, H_{i,1}, \ldots, H_{i,K-1}$ stand for the optimal AI model for host j=0, 1, . . . , K−1, where K is the number of host devices in an outer iteration. Process 200 may determine that global AI model $H'_{i,j}=U(H_{i,0}, H_{i,1}, \ldots, H_{i,K-1})$. In a non-limiting example, function U may include selecting the model with the best performance value. For example, in an outer iteration, a host device may access one or more other host devices and access information about the optimal AI model and associated performance value of those other host devices, and determine the global optimal AI model based on the optimal AI model for the host device itself and the optimal AI models of other host devices. Alternatively and/or additionally, a host device may determine the global optimal AI model based on an average of the optimal AI models among multiple host devices on the network.

In some examples, an AI model may include a one dimensional column vector, which contains all of the parameters of the AI model arranged sequentially in 1D. A subtraction of two AI models may include multiple parameters, each of which is a subtraction of two corresponding parameters in the two AI models. An addition of two AI models may include multiple parameters, each of which is a sum of two corresponding parameters in the two AI models. An average of multiple AI models may include parameters, each of which is an average of the corresponding parameters in the multiple AI models. Similarly, an AI model may be incremented (increased or decreased) by a perturbation, and the resulting model may contain multiple parameters, each of which includes a corresponding parameter in the AI model incremented by a corresponding parameter in the perturbation. In some examples, an addition of two AI models may be in discrete or finite field. For example, the addition of scalars and biases in two (or multiple) CNN models may be done in a real coordinate space. In another example, the addition of masks in multiple CNN models may be done in finite field.

At each iteration, process 200 may continue receiving information about other host devices at 208 and updating the global AI model at 209 based on the performance values of optimal AI models among multiple host devices. In some examples, process 200 may determine the global AI model at 209 based on the optimal AI models of all of the host devices on the network. In some examples, process 200 may determine the global AI model at 209 based on the optimal AI models of a subset of host devices on the network. For example, the process may only analyze top five optimal AI models from five host devices. Alternatively and/or additionally, the process may remove bottom two host devices in terms of performance values and analyze the optimal AI models of the remaining host devices.

With further reference to FIG. 2, at each iteration, process 200 may further include generating updated initial AI models at 210. This updates the initial AI models for the client device(s) under the host device, thus the training process in each client device may "restart." In other words, process 200 may find the global AI model at each iteration (e.g., 209) and cause a training process at a client device to update the initial AI model for the client device. For example, at dth iteration, and for client device i, where i=0, 1, . . . N−1 (N is the number of client devices under the host device), the host device may maintain the current initial AI model at previous iteration $M_{i\_d-1}$, an updated AI model $M_{i\_op}$ (referred to as the local optimal AI model of the client device)), and the global AI model $M_{global}$ across all host devices. For example, the current AI model $M_{i\_d-1}$ and updated AI model $M_{i\_op}$ may be obtained from box 206 for a corresponding client device, the global AI model $M_{global}$ may be obtained from box 209. Process 200 may optimize the training process by adjusting the velocity of AI model.

In some examples, the process may determine a velocity of AI model $\Delta M_{i\_d}$ at the current iteration d based on the velocity of AI model at its previous iteration $\Delta M_{i\_(d-1)}$. The new velocity $\Delta M_{i\_d}$ may also be determined based on the closeness of the current initial AI model for the client device relative to the local optimal AI model for that client device. The new velocity of AI model may also be based on the closeness of the current AI model relative to the global AI model. The closer the current AI model is to the local optimal AI model and/or the global AI model, the lower the velocity of AI model for the next iteration may be. For example, a velocity for client device i at the current dth iteration may be expressed as:

$$\Delta M_{i\_d} = w * \Delta M_{i\_(d-1)} + c1 * r1 * (M_{i\_op} - M_{i\_d-1}) - c1 * r1 * (M_{global} - M_{i\_d-1})$$

where w is the inertial coefficient, c1 and c2 are acceleration coefficients, r1 and r2 are random numbers. In some examples, w may be a constant number selected between [0.8, 1.2], c1 and c2 may be constant numbers in the range of [0, 2]. Random numbers r1 and r2 may be generated at each iteration d. The determination of velocity of AI model described herein may allow the training process to have a new model at each iteration moving towards the local optimal AI model (per client device) and the global optimal model of the system.

In some examples, an AI model, such as $M_{i\_d-1}$, may be a column vector, e.g., an n×1 matrix, containing all of the parameters of the AI model arranged sequentially in 1D. A subtraction of two AI models, such as $M_{global} - M_{i\_d-1}$ may also be a column vector containing multiple parameters, each of which is a subtraction of two corresponding parameters in $M_{global}$ and $M_{i\_d-1}$. In some examples, r1 and r2 may be diagonal matrices, for example, n×n matrices, for which each parameter in the column vector corresponds to different randomly-generated r1 and r2. As such, the training process, such as process 200, becomes an n-dimensional optimization problem. As described herein, the velocity of an AI model, e.g., $\Delta M_{i\_d}$, $\Delta M_{i\_(d-1)}$, may contain the same number of parameters as that in the AI model and have the same dimension as the AI model. Once the velocity $\Delta M_{i\_d}$ is determined, the process may increment the current initial AI model at the previous iteration by the new velocity to determine an updated initial AI model. For example, the updated initial AI model for device i may be determined as $M_{i\_d} = M_{i\_d-1} + \Delta M_{i\_d}$. Process 200 may determine the updated initial models for all of the client devices under the host device in a similar manner. Upon completion of the process at 218, process 200 may further transmit the updated initial AI models to a respective client device.

Figure 3:
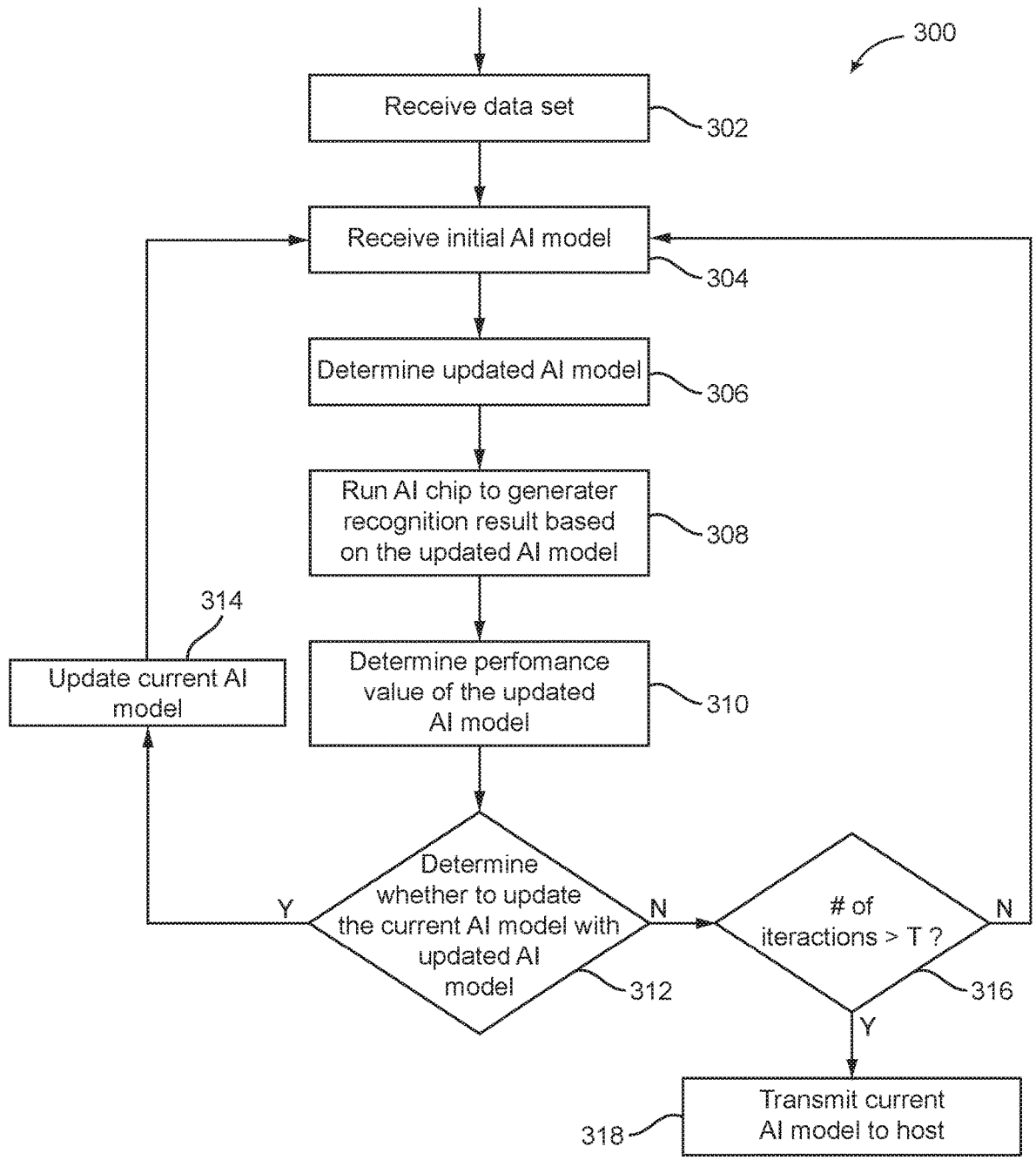
FIG. 3 illustrates a diagram of an example process for obtaining a local AI model that is implemented in a processing device in accordance with various examples described herein.

Now FIG. 3 illustrates a diagram of an example process for obtaining a local AI model that may be implemented in a processing device, such as a client device. A process 300, which may be implemented in a client device, a host device and/or an AI chip, such as shown in FIG. 1, may train an AI model via one or more iterations. In each iteration, process 300 may receive the initial AI model for the client device at 304. For example, at the beginning of the training process, an initial AI model may be defined for some or all of the client devices, and process 300 may receive the initial AI model. Once the training process (e.g., 200 in FIG. 2) has started iterations, process 300 may receive an updated initial AI model, which may be determined by a host device of the client device (e.g., 210 in FIG. 2). Process 300 may also receive one or more test datasets at 302. For example, the dataset may be residing on any of the devices (host or client devices) on the communication network (e.g., 102 in FIG. 1) and may be accessible to any other devices.

Process 300 may also determine an updated AI model at 306 based on the received initial AI model. In some examples, the process may generate an updated model by incurring a perturbation to the initial AI model. For example, at mth iteration in process 300, an updated AI model for client device i may be represented as $M_{i\_m} = M_{i\_m-1} + \Delta M$, where $\Delta M$ is the perturbation. In some examples, process 300 may include a simulated annealing process in which a small change to the parameters of the AI model are made. For example, an AI model may include three groups of parameters: the scalar, the mask (kernels), and the bias. In a CNN model, a computation in a given layer in the CNN may be expressed by $Y = w * X + b$, where X is input data, Y is output data in the given layer, w is a kernel, and b is a bias. Operation "*" is a convolution. Kernel w may include binary values. For example, a kernel may include 9 cells in a 3×3 mask, where each cell may have a binary value, such as "1" and "−1." In such case, a kernel may be expressed by multiple binary values in the 3×3 mask multiplied by a scalar. The scalar may include a value having a bit width, such as 12-bit or 16-bit. Other bit length may also be possible. By multiplying each binary value in the 3×3 mask with the scalar, a kernel may contain values of higher bit-length. Alternatively, and/or additionally, a kernel may contain data with n-value, such as 7-value. The bias b may contain a value having multiple bits, such as 12 bits. Other bit length may also be possible.

Returning to block 306 in FIG. 3, updating the AI model may including updating one or more parameters of the AI model with a probability to change and an amplitude of change for a group of parameters. For example, the probabilities to change the scalar, the mask and the bias may each be 0.01, 0.001, and 0.01, respectively. The amplitude of change for scalar and bias may be 0.001. In an example implementation, the process may generate a random number, e.g., in the range of 0 and 1.0, and compare the random number to the probabilities for the group of parameters. If the random number exceeds the probability for a given group of parameters, that group of parameters may change according to the amplitude of change. In case of the previous example, a random number may be generated. If the random number is greater than 0.01, the process may subsequently change the scalar by 0.001. In changing the values in a mask, the process may change each value in the mask to its neighboring value. For example, if a value in a mask is a binary having two values {+1, −1}, each change of value may become a switching between the two values (−1 or +1).

With further reference to FIG. 3, process 300 may further including inferring the performance of the updated AI model by running the AI chip in the client device to generate a recognition result based on the updated AI model at 308 and determining the performance value of the updated AI model at 310. In some examples, running the AI chip in the client device may include causing a processing device in the client device to execute a recognition task in the AI chip where an embedded CeNN of the AI chip contains the updated AI model, such as a CNN. In other words, if the AI chip is a hardware-based chip, the parameters of the updated AI model are loaded into the CeNN of the AI chip for performing the recognition tasks. A recognition task may depend on the dataset. For example, a dataset may include sample training images of scenes for a scene recognition task. For a recognition task using the dataset, a performance value may be measured against the AI model being used. For example, an accuracy value may be determined at 310 based on the result of a given recognition task using the updated AI model.

In some examples, process 300 maintains the current AI model and associated performance value at each iteration. A client device may also receive from its host device or have access to the optimal AI model of the host device among all client devices on the host and/or the associated performance value of the optimal AI model. An example of obtaining an optimal AI model of a host device is shown in 207 in FIG. 2. Upon determining the performance value of the updated AI model, process 300 may further determine whether to replace the current AI model with the updated AI model so that the process is able to maintain the optimal AI model at any time. In some examples, process 300 may determine to replace the current AI model with the updated AI model with a probability, which indicates a probability that the current AI model in the client device be replaced by the updated AI model. This probability may be determined based on the performance value of the updated AI model relative to the past performance value in the previous iteration. For example, a probability (for replacing the current AI model) may have a value of one (100%) if the updated AI model has a performance value that is better than the performance value of the optimal AI model of the host on which the current client device is residing.

Alternatively, and/or additionally, if the updated AI model has a performance value that is no better than the performance value of the optimal AI mode of the host, process 300 may still have a probability to replace the current AI model with the updated AI model. This may prevent the process from being "locked" into a local optimal point permanently so that the process can get on a healthy convergence curve to achieve a global optimal AI model. In an example implementation, the process may generate a random number, e.g., in the range of 0 and 1.0, and compare the random number to the probabilities for replacing the current AI model. If the random number exceeds the probability, that process may determine that the current AI model be replaced by the updated AI model. Otherwise, the process may continue without replacing the current AI model with the updated AI model.

In a non-limiting example, the probability for replacing the current AI model may decrease as the performance value of the updated AI model gets closer to the optimal AI model of the host device this is because, once the performance value of the AI model in the training is approaching an optimal value, the process may tend to converge and the probability of replacing the optimal AI model may diminish. Similarly, if the training process is on a healthy curve, it means that the training process should converge as time passes by. As such, the probability of replacing the optimal AI model should decrease as the number of iterations increases. In a non-limiting example, the probability may be determined as:

$$p = e^{-(A_{op} - A_m)*m}/C$$

where $A_{op}$ is the performance value of the optimal AI model of the host that hosts the client device, $A_m$ is the current AI model in the client device, m is the number of iterations, and C is a constant factor. For example, C may be selected as 0.001. Other variations of determining the probability may also be possible.

With further reference to FIG. 3, if it is determined that the current AI model be replaced by the updated AI model, process 300 may proceed with replacing the current AI model with the updated AI model at 314 and repeats the iteration at 304. If it is determined that the current AI model not be replaced by the updated AI model, the process may repeat the iteration at 304, provided that the number of iterations has not exceeded a threshold T at 316. If the number of iterations has exceeded the threshold T, the process may stop the iteration and transmit the current AI model to the host device at 318. At this point, the current AI model may be noted as a local optimal AI model of the client device. In a host device, a training process (e.g., process 200 in FIG. 2) may receive the updated AI models (or local optimal AI models) from the client devices under that host device (e.g., 206 in FIG. 2) and continue executing one or more steps in that training process to obtain the global AI model.

It is appreciated that the disclosures of various embodiments in FIGS. 1-4 may vary. For example, the number of iterations in process 200 in FIG. 2 and the number of iterations in process 300 in FIG. 3 may be independent. For example, the number of iterations for a client device may be in the range of 10-100, and the number of iterations for a host device may be 100. Other values may also be possible.

Figure 4:
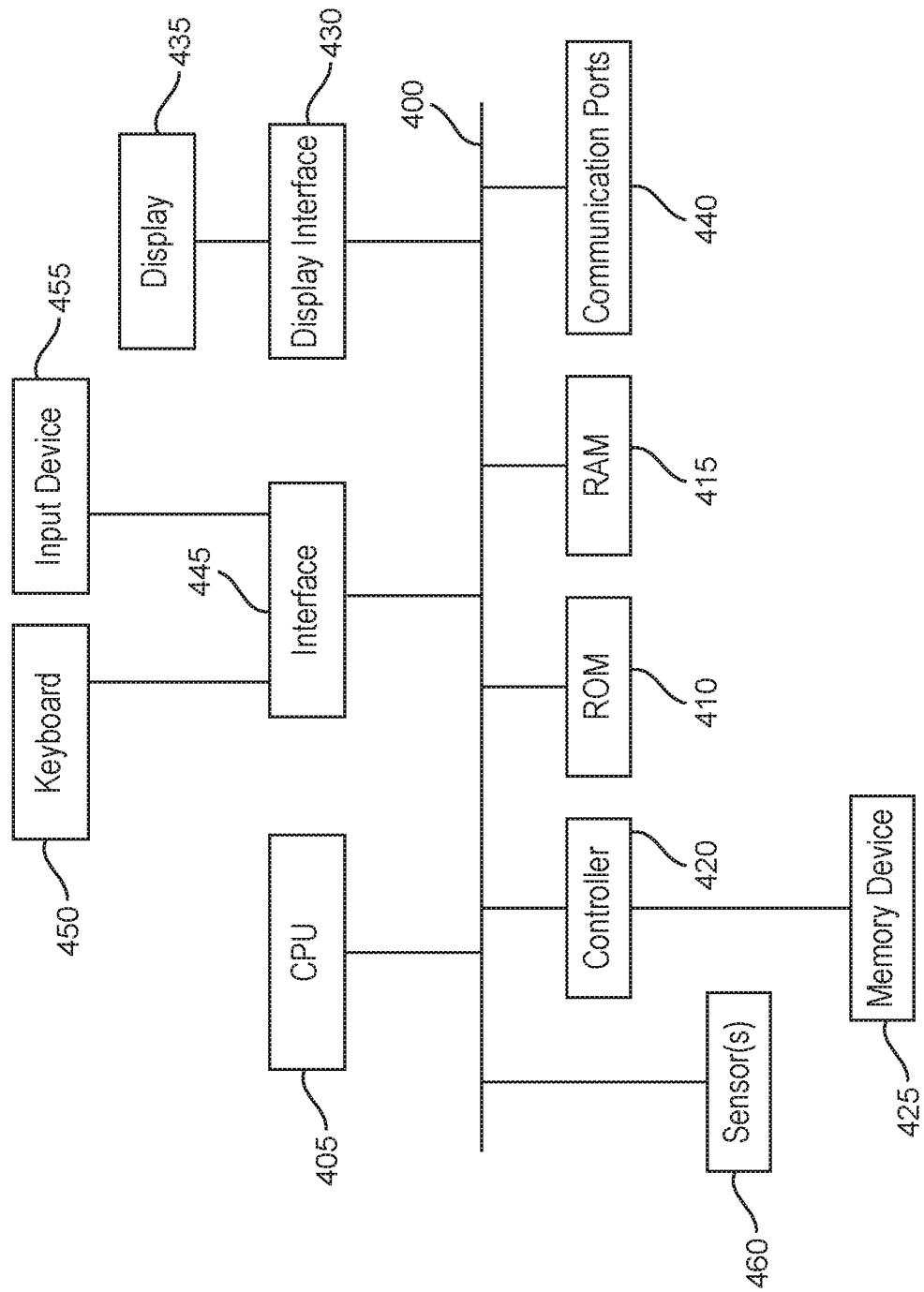
FIG. 4 illustrates various embodiments of one or more electronic devices for implementing the various methods and processes described herein.

FIG. 4 depicts an example of internal hardware that may be included any electronic device or computing system for implementing various methods in the embodiments described in FIGS. 1-3. An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives, and other devices capable of storing electronic data constitute examples of memory devices 425. A memory device, also referred to as a computer-readable medium, may include a single device or a collection of devices across which data and/or instructions are stored.

An optional display interface 430 may permit information from the bus 400 to be displayed on a display device 435 in visual, graphic, or alphanumeric format. An audio interface and audio output (such as a speaker) also may be provided. Communication with external devices may occur using various communication ports 440 such as a transmitter and/or receiver, antenna, an RFID tag and/or short-range, or near-field communication circuitry. A communication port 440 may be attached to a communications network, such as the Internet, a local area network, or a cellular telephone data network.

The hardware may also include a user interface sensor 445 that allows for receipt of data from input devices 450 such as a keyboard, a mouse, a joystick, a touchscreen, a remote control, a pointing device, a video input device, and/or an audio input device, such as a microphone. Digital image frames may also be received from an imaging capturing device 455 such as a video or camera that can either be built-in or external to the system. Other environmental sensors 460, such as a GPS system and/or a temperature sensor, may be installed on system and communicatively accessible by the processor 405, either directly or via the communication ports 440. The communication ports 440 may also communicate with the AI chip to upload or retrieve data to/from the chip. For example, the global optimal AI model may be shared by all of the processing devices on the network. Any device on the network may receive the global AI model from the network and upload the global AI model, e.g., CNN weights, to the AI chip via the communication port 440 and an SDK (software development kit). The communication port 440 may also communicate with any other interface circuit or device that is designed for communicating with an integrated circuit.

Optionally, the hardware may not need to include a memory, but instead programming instructions are run on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a CeNN architecture may be residing in an electronic mobile device. The electronic mobile device may use the built-in AI chip to produce recognition results and generate performance values. In some scenarios, obtaining the CNN can be done in the mobile device itself, where the mobile device retrieves test data from a dataset and uses the built-in AI chip to perform the training. In other scenarios, the processing device may be a server device in the communication network (e.g., 102 in FIG. 1) or may be on the cloud. These are only examples of applications in which an AI task can be performed in the AI chip.

The various systems and methods disclosed in this patent document provide advantages over the prior art, whether implemented standalone or combined. For example, using the systems and methods described in FIGS. 1-4 may help obtain the global optimal AI model using multiple networked devices in either centralized or decentralized or distributed network. This networked approach helps the system to narrow the search space of the AI model during the training process thus the system may converge to the global optimal AI model faster. The above disclosed embodiments also allow different training methods to be adapted to obtain the global optimal AI model, whether test data dependent or test data independent. For example, a client device may implement its own training process to obtain the local optimal AI model. Above illustrated embodiments are described in the context of generating a CNN model for an AI chip (physical or virtual), but can also be applied to various other applications. For example, the current solution is not limited to implementing the CNN but can also be applied to other algorithms or architectures inside an AI chip.

It will be readily understood that the components of the present solution as generally described herein and illustrated in the appended figures could be arranged and designed in a wide variety of different configurations. Thus, the following more detailed description of various implementations, as represented in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification nay, but do not necessarily, refer to the same embodiment.

Furthermore, the described features, advantages, and characteristics of the present solution may be combined in any suitable manner in one or more embodiments. One ordinarily skilled in the relevant ill recognize, in light of the description herein, that the present solution can be practiced without one or more of the specific features or advantages of a particular embodiment. In other instances, additional features and advantages may be recognized in certain embodiments that may not be present in all embodiments of the present solution.

Other advantages can be apparent to those skilled in the art from the foregoing specification. Accordingly, it will be recognized by those skilled in the art that changes, modifications, or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:

1. A system comprising:
a plurality of artificial intelligence (AI) chips; and
a physical processing device communicatively coupled to the plurality of AI chips and configured to:
(i) receive a respective AI model and an associated performance value of the respective AI model from each of the plurality of AI chips;
(ii) determine an optimal AI model that has a best performance value among the performance values associated with the respective AI models from the plurality of AI chips; and
(iii) determine a global AI model based on the optimal AI model; and
(iv) transmit a respective initial AI model to each of the plurality of AI chips before receiving the respective AI model, wherein each respective AI model is generated based on the transmitted respective initial AI model;
wherein the physical processing device is further configured to:
repeat steps (i)-(iv) for a number of iterations; and
at each iteration, generate at least a first initial AI model for a first AI chip of the plurality of AI chips based on a first previous initial AI model for the first AI chip that is generated at a preceding iteration and a velocity of AI model for the first AI chip; and generate at least a second initial AI model different from the first initial AI model for a second AI chip of the plurality of AI chips based on a second previous initial AI model for the second AI chip that is generated at the preceding iteration and a velocity of AI model for the second AI chip.

2. The system of claim 1, wherein the velocity of AI model for the first AI chip is based on at least one of (1) a closeness of the first previous initial AI model relative to the optimal AI model; and (2) a closeness of the first previous initial AI model relative to the global AI model; and wherein the velocity of AI model for the second AI chip is based on at least one of (1) a closeness of the second previous initial AI model relative to the optimal AI model; and (2) a closeness of the second previous initial AI model relative to the global AI model.

3. The system of claim 1, wherein the physical processing device is further configured to, upon a completion of the number of iterations, cause the global AI model to be loaded into an AI chip to cause the AI chip to perform an AI task based on the global AI model in the AI chip.

4. The system of claim 1, wherein the physical processing device is further configured to, upon detecting that a time period has lapsed before a completion of the number of iterations, suspend repeating the steps (i)-(iv) and cause the global AI model to be loaded into an AI chip to cause the AI chip to perform an AI task based on the global AI model in the AI chip.

5. The system of claim 1, wherein the physical processing device is configured to determine the optimal AI model by selecting an AI model among the respective AI models from the plurality of AI chips that has a best performance value.

6. The system of claim 1 is configured to determine the respective AI model for each of the plurality of AI chips by:
in each iteration, executing an AI task in the AI chip based on the respective initial AI model received from the physical processing device.

7. A system comprising:
a first physical processing device communicatively coupled to a first plurality of client devices each including an artificial intelligence (AI) chip; and
a second physical processing device communicatively coupled to a second plurality of client devices each including an AI chip;
wherein:
the first processing device is configured to:
receive a first plurality of AI models and a performance value associated with each of the first plurality of AI models from the first plurality of client devices; and
determine a first optimal AI model that has a first optimal performance value among the performance values associated with the first plurality of AI models from the first plurality of client devices;
the second processing device is configured to:
receive a second plurality of AI models and a performance value associated with each of the second plurality of AI models from the second plurality of client devices; and
determine a second optimal AI model that has a second optimal performance value among the performance values associated with the second plurality of AI models from the second plurality of client devices; and each of the first and second processing devices is further configured to:
determine a global AI model based on the first and second optimal AI models;
transmit a respective first initial AI model to each of the first plurality of client devices before receiving the first plurality of AI models from the first plurality of client devices, wherein each of the first plurality of AI models is generated from a respective client device of the first plurality of client devices based on the respective first initial AI model transmitted to the respective client device;
generate at least a second initial AI model for a first client device of the first plurality of client devices based on the respective first initial AI model and a velocity of AI model for the first client device;
transmit the second initial AI model to the first client device;
generate at least a third initial AI model different from the second initial AI model for a second client device of the first plurality of client devices based on the respective first initial AI model and a velocity of AI model for the second client device; and
transmit the third initial AI model to the second client device.

8. The system of claim 7,
wherein the velocity of AI model for the first client device is based on at least one of (1) a closeness of the respective first initial AI model for the first client device relative to the first optimal AI model; and (2) a closeness of the respective first initial AI model for the first client device relative to the global AI model; and
wherein the velocity of AI model for the second client device is based on at least one of (1) a closeness of the respective first initial AI model for the second client device relative to the first optimal AI model; and (2) a closeness of the respective first initial AI model for the second client device relative to the global AI model.

9. A method comprising, at a processing device:
(i) receiving a respective AI model and an associated performance value of the respective AI model from each of a plurality of client devices communicatively coupled to the processing device, wherein each of the plurality of devices includes an artificial intelligence (AI) chip;
(ii) determining an optimal AI model that has a best performance value among the performance values associated with the respective AI models from the plurality of client devices; and
(iii) determining a global AI model based on the optimal AI model;
(iv) transmitting a respective initial AI model to each of the plurality of client devices before receiving the respective AI model, wherein each respective AI model is generated from each of the plurality of client devices based on the transmitted respective initial AI model; and
repeating steps (i)-(iv) for a number of iterations;
wherein repeating comprises, at each iteration:
generating at least a first initial AI model for a first client device of the plurality of client devices based on a first previous initial AI model for the first client device that is generated at a preceding iteration and a velocity of AI model for the first client device; and generating at least a second initial AI model different from the first initial AI model for a second client device of the plurality of client devices based on a second previous initial AI model for the second client device that is generated at the preceding iteration and a velocity of AI model for the second client device.

10. The method of claim 9, wherein the velocity of AI model for the first client device or the second client device is based on at least one of (1) a closeness of the respective first or second previous initial AI model relative to the optimal AI model; and (2) a closeness of the respective first or second previous initial AI model relative to the global AI model.

11. The method of claim 9 further comprising, upon a completion of the number of iterations, loading the global AI model to an AI chip of a client device to cause the client device to perform an AI task based on the global AI model in the AI chip.

12. The method of claim 9 further comprising:
detecting that a time period has lapsed before a completion of the number of iterations;
suspending repeating the steps (i)-(iv); and
loading the global AI model into an AI chip of a client device to cause the client device to perform an AI task based on the global AI model in the AI chip.

13. The method of claim 9, wherein determining the optimal AI model comprises selecting an AI model among the respective AI models from the plurality of client devices that has a best performance value.

14. The method of claim 9 further comprises determining the respective AI model for each of the plurality of client devices by:
in each iteration, executing an AI task in the AI chip of the client device based on the respective initial AI model received from the processing device.

15. A method comprising:
at a first processing device:
receiving a first plurality of AI models and a performance value associated with each of the first plurality of AI models from a first plurality of client devices, wherein each of the first plurality of devices includes an artificial intelligence (AI) chip; and
determining a first optimal AI model that has a first optimal performance value among the performance values associated with the first plurality of AI models;
at a second processing device:
receiving a second plurality of AI models and a performance value associated with each of the second plurality of AI models from a second plurality of client devices, wherein each of the second plurality of devices includes an AI chip; and
determining a second optimal AI model that has a second optimal performance value among the performance values associated with the second plurality of AI models; and
at each of the first and second processing devices:
determining a global AI model based on the first and second optimal AI models;
transmitting a respective first initial AI model to each of the first plurality of client devices before receiving the first plurality of AI models from the first plurality of client devices, wherein each of the first plurality of AI models is generated from a respective client device of the first plurality of client devices based on the respective first initial AI model transmitted to the respective client device;
generating at least a second initial AI model for a first client device of the first plurality of client devices based on the respective first initial AI model and a velocity of AI model for the first client device;
transmit the second initial AI model to the first client device;
generate at least a third initial AI model different from the second initial AI model for a second client device of the first plurality of client devices based on the respective first initial AI model and a velocity of AI model for the second client device; and
transmit the third initial AI model to the second client device.

16. The method of claim 15,
wherein the velocity of AI model for the first client device or the second client device is based on at least one of (1) a closeness of the respective first initial AI model for the first or second client device relative to the first optimal AI model; and (2) a closeness of the respective first initial AI model for the first or second client device relative to the global AI model.

* * * * *